(12) United States Patent
Shibuya et al.

(10) Patent No.: US 10,414,298 B2
(45) Date of Patent: Sep. 17, 2019

(54) VEHICLE SEAT

(71) Applicants: TS TECH CO., LTD., Asaka-shi, Saitama (JP); HONDA MOTOR CO., LTD., Tokyo (JP)

(72) Inventors: Makoto Shibuya, Tochigi (JP); Akira Shirai, Tochigi (JP); So Iwakata, Tochigi (JP); Yuma Oga, Saitama (JP)

(73) Assignees: TS Tech Co., Ltd., Saitama (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/447,481

(22) Filed: Mar. 2, 2017

(65) Prior Publication Data

US 2017/0259709 A1 Sep. 14, 2017

(30) Foreign Application Priority Data

Mar. 8, 2016 (JP) .................................. 2016-044561

(51) Int. Cl.
*B60N 2/28* (2006.01)
*B60N 2/58* (2006.01)
*B60N 2/60* (2006.01)

(52) U.S. Cl.
CPC ............. *B60N 2/2893* (2013.01); *B60N 2/58* (2013.01); *B60N 2/6009* (2013.01)

(58) Field of Classification Search
CPC ...... B60N 2/5833; B60N 2/58; B60N 2/2887; B60N 2/60; B60N 2/609

(Continued)

(56) References Cited

U.S. PATENT DOCUMENTS 5,139,311 A * 8/1992 Imai ........................ B60R 22/02
  297/481
6,416,128 B1 * 7/2002 Fujii .................... B60N 2/2893
  297/218.1

(Continued)

FOREIGN PATENT DOCUMENTS

DE 10243633 A1 * 4/2004 .......... B60N 2/2893
DE 10 2006 060 121 A1 6/2008

(Continued)

OTHER PUBLICATIONS

Machine translation of foreign reference JP 2001-246973, obtained from https://www4.j-platpat.inpit.go.jp/cgi-bin/tran_web_cgi_ejje?u=http://www4.j-platpat.inpit.go.jp/eng/translation/ 2018030209260357519861019490592242782F47B4BACDE6F58F73A9FF90546AD5C (last accessed on Mar. 1, 2018) (Year: 2018).*

(Continued)

*Primary Examiner* — Theodore V Adamos
(74) *Attorney, Agent, or Firm* — Drinker Biddle & Reath LLP

(57) ABSTRACT

A vehicle seat includes: a seat back; a seat cushion; an engagement portion having a U-shaped portion that is configured to engage with an attachment mechanism of a child safety seat; and a cover member adapted to cover at least a portion of the engagement portion. The engagement portion is disposed between a seat back and a seat cushion. The cover member includes: a flap having one end fixed to a cover of the vehicle seat and the other end serving as a free end; and a tab provided on an upper or lower surface of the flap, the tab projecting on an inner side of the U-shaped portion when the free end is inserted between the seat back and the cover member or between the seat cushion and the engagement portion.

12 Claims, 16 Drawing Sheets

(58) Field of Classification Search
USPC .......... 297/253, 481, 452.48, 219.1, 452.38
See application file for complete search history.

(56) References Cited

U.S. PATENT DOCUMENTS

| | | | | |
|---|---|---|---|---|
| 7,281,763 | B1* | 10/2007 | Hayashi | B60N 2/2893 297/253 |
| 9,493,099 | B2* | 11/2016 | Ruthinowski | B60N 2/70 |
| 2007/0176476 | A1* | 8/2007 | Weber | B60N 2/2893 297/253 |
| 2007/0273177 | A1* | 11/2007 | Sankrithi | B60P 3/423 296/181.1 |
| 2009/0212610 | A1* | 8/2009 | Yajima | B60N 2/449 297/217.1 |
| 2013/0093233 | A1* | 4/2013 | Kajihara | B60N 2/58 297/452.38 |
| 2017/0259710 | A1* | 9/2017 | Oga | B60N 2/2893 |

FOREIGN PATENT DOCUMENTS

| | | | | |
|---|---|---|---|---|
| JP | 2000-296733 | A | 10/2000 | |
| JP | 2001-122004 | A | 5/2001 | |
| JP | 2001-246973 | A | 9/2001 | |
| JP | 3462142 | B2* | 11/2003 | ............ B60N 2/289 |
| JP | 2008-007101 | A | 1/2008 | |
| JP | 2009-137520 | A | 6/2009 | |

OTHER PUBLICATIONS

Machine translation of foreign reference DE 10 2006 060 121, obtained from http://translationportal.epo.org/emtp/translate/?ACTION=description-retrieval&COUNTRY=DE&ENGINE=google&FORMAT=docdb&KIND=A1&LOCALE=en_EP&NUMBER=102006060121&OPS=ops.epo.org/3.2&SRCLANG=de&TRGLANG=en (last accessed Mar. 1, 2018) (Year: 2018).*

Machine translation for foreign reference DE 10243633, obtained from http://translationportal.epo.org/emtp/translate/?ACTION=description-retrieval&COUNTRY=DE&ENGINE=google&FORMAT=docdb&KIND=A1&LOCALE=en_EP&NUMBER=10243633&OPS=ops.epo.org/3.2&SRCLANG=de&TRGLANG=en (last accessed on Mar. 1, 2018) (Year: 2018).*

Machine translation for foreign reference JP 2009-137520, obtained from https://www4.j-platpat.inpit.go.jp/cgi-bin/tran_web_cgi_ejje?u=http://www4.j-platpat.inpit.go.jp/eng/translation/ 20180302105245114198662209154604477BF47B4BACDE6F58F73A9FF90546AD5C (last accessed on Mar. 1, 2018) (Year: 2018).*

Machine translation of foreign reference JP 3462142, obtained from https://www4.j-platpat.inpit.go.jp/cgi-bin/tran_web_cgi_ejje?u=http://www4.j-platpat.inpit.go.jp/eng/translation/ 201901111059250421550284126148755C20B98F0964242AEA9FFDB7AE067C97C, (last accessed on Jan. 10, 2018) (Year: 2018).*

Machine translation of foreign reference JP 2001-122004, obtained from https://www4.j-platpat.inpit.go.jp/cgi-bin/tran_web_cgi_ejje?u=http://www4.j-platpat.inpit.go.jp/eng/translation/ 20190111102240441550463124595668C20B98F0964242AEA9FFDB7AE067C97C (last accessed on Jan. 10, 2018) (Year: 2018).*

Office Action issued in related application JP 2016-044561, dated Dec. 19, 2017, with machine generated English language translation, 9 pages.

* cited by examiner

VEHICLE SEAT

CROSS REFERENCE TO RELATED APPLICATIONS

This application is based upon and claims the priority benefit of Japanese Patent Application No. JP2016-044561, filed Mar. 8, 2016, the contents being incorporated herein by reference.

BACKGROUND

The present disclosure relates to a vehicle seat on which a child safety seat can be installed.

There has been a well-known vehicle seat including an engagement portion that is engaged with a child safety seat to fix the child safety seat on a rear seat of a vehicle. As such a vehicle seat, for example, Japanese Patent Application Publication No. 2008-007101 (JP 2008-007101 A) describes a rear seat including an engagement portion that is engaged with an ISO standard child safety seat to fix the child safety seat.

In JP 2008-007101 A, respective hook-and-loop fasteners are provided on a cover member and a cover of a seat. In a state where the child safety seat is not installed, the hook-and-loop fasteners are engaged with each other such that the engagement portion is covered by the cover member. In addition, in a state where the child safety seat is installed, the engaged hook-and-loop fasteners are disengaged from each other such that the engagement portion is uncovered.

However, in the related art described above, in order to install the child safety seat, it is necessary for the engaged hook-and-loop fasteners to be disengaged from each other such that the engagement portion is uncovered. In order to cover the engagement portion with the cover member, it is necessary for the hook-and-loop fasteners to be engaged with each other. Accordingly, the related art requires additional work by a user to change the cover between the covered and uncovered states with the cover member. Furthermore, the number of components of a mechanism for covering the engagement portion is increased.

SUMMARY

The present disclosure has been made in view of the above-described problems. An embodiment of the present disclosure provides a vehicle seat that can more easily change an engagement portion, configured to engage with an attachment mechanism of a child safety seat, between covered and uncovered states with a cover member.

The above problems are solved by a vehicle seat according to an embodiment of the present disclosure. The vehicle seat includes: a seat back; a seat cushion; an engagement portion having an end portion that is configured to engage with an attachment mechanism of the child safety seat; and a cover member adapted to cover at least a portion of the engagement portion. The engagement portion is disposed between the seat back and the seat cushion. The cover member includes: a base material having a fixed end that is fixed to a cover of the vehicle seat and a free end that is not fixed to the cover; and a projecting portion provided on one of an upper surface and a lower surface of the base material, the projecting portion being configured to project on an inner side of the end portion of the engagement portion when the free end is inserted between engagement portion and one of the seat back and the seat cushion.

According to the vehicle seat described above, the engagement portion, configured to engage with the attachment mechanism of the child safety seat, can be more easily changed between covered and uncovered states with the cover member. In other words, when the child safety seat is not installed, the engagement portion can be easily covered by the cover member, and when the child safety seat is installed, the engagement portion can be easily uncovered. In addition, the number of components of a mechanism for covering the engagement portion can be reduced.

In the vehicle seat, the projecting portion may extend from a connecting portion with the base material toward the fixed end. Accordingly, the projecting portion projecting on the inner side of the end portion of the engagement portion is not easily unhooked or removed from the inner side of the end portion of the engagement portion that is engaged with the attachment mechanism of the child safety seat.

In the foregoing vehicle seat, the projecting portion may be hooked by a front end of the end portion of the engagement portion. Accordingly, the base material of the cover member is pushed between the engagement portion and the seat back or between the engagement portion and the seat cushion, whereby the projecting portion of the cover member can be easily hooked by the front end of the end portion of the engagement portion. Therefore, the engagement portion can be easily covered by the cover member.

In the foregoing vehicle seat, the projecting portion may be provided on the lower surface of the base material, and the projecting portion may be hooked by the front end of the end portion from above the end portion of the engagement portion when the free end is inserted between the seat back and the engagement portion. Accordingly, the base material of the cover member is pushed between the engagement portion and the seat back, whereby the projecting portion of the cover member can be easily hooked by the end portion of the engagement portion from above. In addition, the base material of the cover member covers an upper portion of the engagement portion, thereby inhibiting the engagement portion from being uncovered. Therefore, an aesthetic design of the vehicle seat can be improved. In addition, the engagement portion can be suitably protected by the cover member.

In the foregoing vehicle seat, the projecting portion may be provided on the upper surface of the base material, and the projecting portion may be hooked by the front end portion from below the end portion of the engagement portion when the free end is inserted between the seat cushion and the engagement portion. Accordingly, the base material of the cover member is pushed between the engagement portion and the seat cushion, whereby the projecting portion of the cover member can be easily hooked by the end portion of the engagement portion from below.

In the foregoing vehicle seat, the projecting portion may be elastically deformable. Accordingly, a state where the cover member is hooked by the engagement portion is easily maintained. Therefore, even if a tilt of the seat back is changed, the cover member is not easily unhooked from the engagement portion.

In the foregoing vehicle seat, the projecting portion may be formed by sewing an end of the base material, which is positioned adjacent to the free end, in a folded state. Accordingly, the number of components of the cover member can be reduced.

In the foregoing vehicle seat, the base material and the projecting portion may be formed separately from each other, and the projecting portion may be sewn together with the base material. Accordingly, the projecting portion can be provided at any desired position in the cover member.

In the foregoing vehicle seat, the projecting portion may have a loop portion. Accordingly, the projecting portion can be easily configured to be elastically deformable. Therefore, a state in which the cover member is hooked by the engagement portion can be easily maintained.

In the foregoing vehicle seat, a width of the base material may be larger than a width of the end portion of the engagement portion, and a width of the projecting portion may be smaller than the width of the end portion of the engagement portion. Accordingly, the base material of the cover member can widely cover the engagement portion, and the projecting portion of the cover member is easily hooked by the engagement portion.

According to an embodiment, the engagement portion, configured to engage with the attachment mechanism of the child safety seat, can be easily changed between covered and uncovered states with the cover member.

According to an embodiment, the projecting portion projecting on the inner side of the end portion of the engagement portion that is engaged with the attachment mechanism of the child safety seat is not easily unhooked from the inner side of the end portion of the engagement portion.

According to an embodiment, the engagement portion can be easily covered by the cover member.

According to an embodiment, the engagement portion can be inhibited from being uncovered.

According to an embodiment, the projecting portion of the cover member can be easily hooked by the end portion of the engagement portion from below.

According to an embodiment, a state in which the cover member is hooked by the engagement portion is easily maintained.

According to an embodiment, the number of components of the cover member can be reduced.

According to an embodiment, the projecting portion can be provided at any desired position in the cover member.

According to an embodiment, the base material of the cover member can widely cover the engagement portion, and the projecting portion of the cover member is easily hooked by the engagement portion.

BRIEF DESCRIPTION OF THE DRAWINGS

Various embodiments of the invention are illustrated in the drawings, in which.

DETAILED DESCRIPTION

A vehicle seat S according to an embodiment of the present disclosure (hereinafter referred to as the embodiment) is described below with reference to FIGS. 1 to 16.

Figure 1:
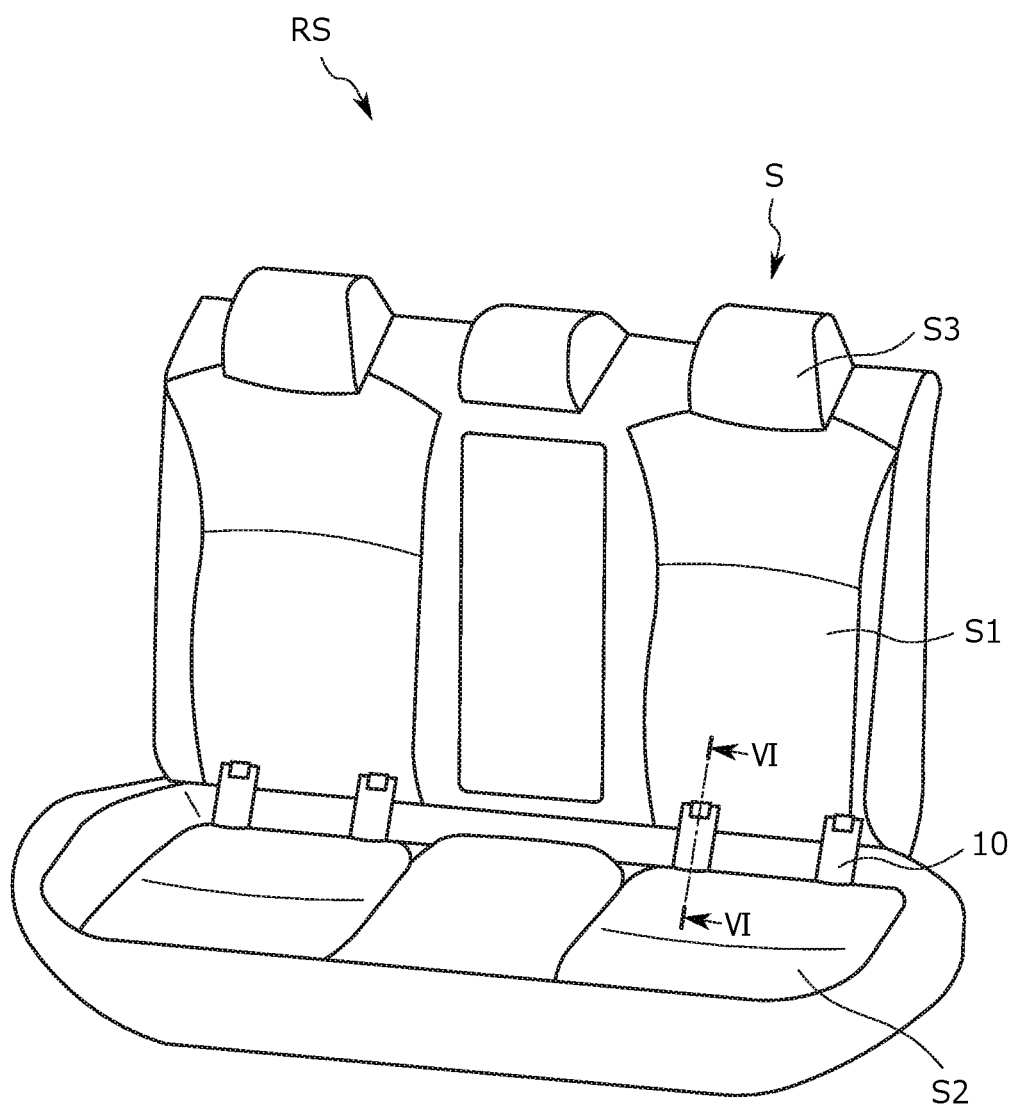
FIG. 1 is an outline, perspective view of a rear seat according to an embodiment of the present disclosure.

FIG. 1 is an outline, perspective view of a rear seat RS including the vehicle seat S according to the embodiment. The rear seat RS includes a center rear seat and side rear seats provided on the lateral sides of the center rear seat, respectively, and thus three passengers can be seated on the rear seat RS. In an embodiment, one of the side rear seats is the vehicle seat S.

In the following descriptions, a "front-to-back direction" means a front-to-back direction as viewed from a passenger seated on the vehicle seat S and is coincident with a traveling direction of a vehicle. A "seat width direction" means a lateral direction of the vehicle seat S and is coincident with a right-to-left direction as viewed from a passenger seated on the vehicle seat S. In addition, in the following descriptions, "left" and "right" refers to left and right as viewed from a seated passenger. Furthermore, a "height direction" means a height direction of the vehicle seat S and is coincident with an up-to-down direction when the vehicle seat S is viewed from the front side thereof.

As shown in FIG. 1, the vehicle seat S includes a seat back S1, a seat cushion S2, and a headrest S3.

The seat back S1 forms a backrest surface for supporting the back and waist of a passenger seated on the vehicle seat S. The seat cushion S2 forms a seating surface for supporting the hip and thigh of the passenger seated on the vehicle seat S. The headrest S3 forms a head supporting surface for supporting the head of the passenger seated on the vehicle seat S.

Figure 2:
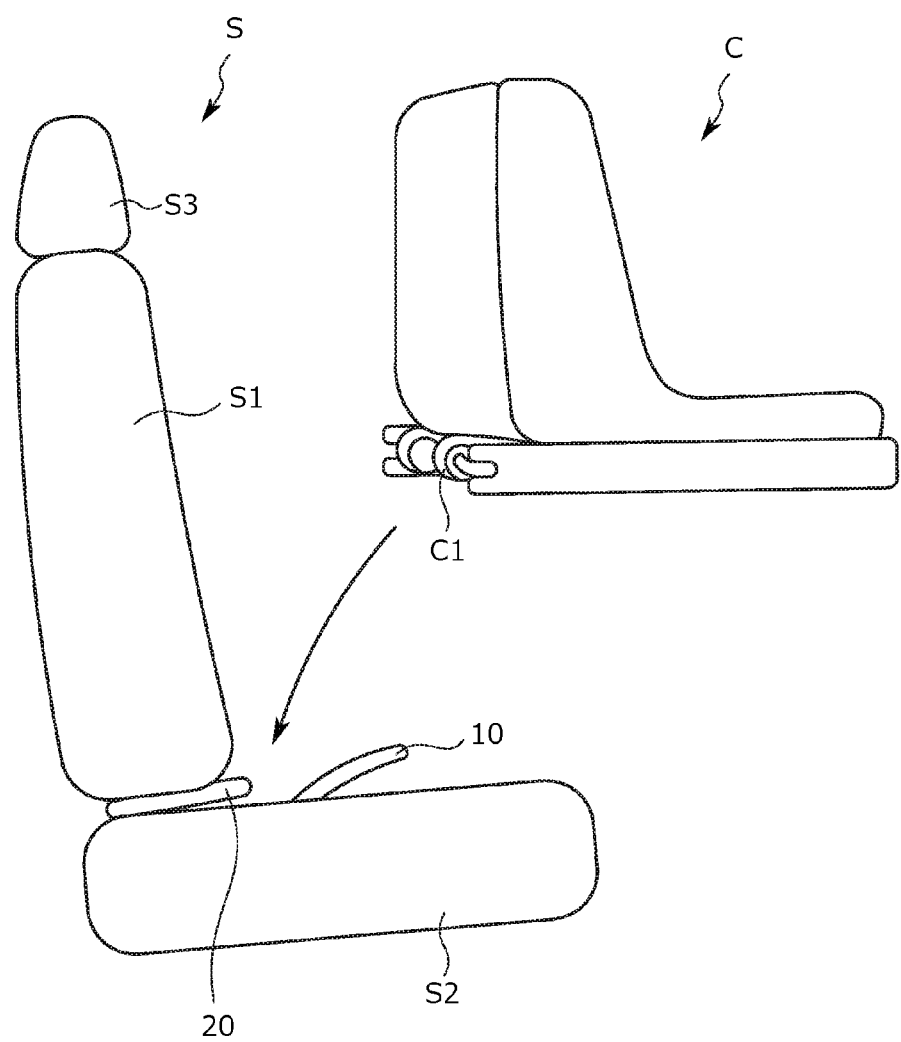
FIG. 2 is an explanatory drawing illustrating a configuration for installing a child safety seat on a vehicle seat.

As shown in FIG. 2, a child safety seat C can be attached to the vehicle seat S and other vehicle seats and includes an attachment mechanism C1 that allows the child safety seat C to be fixed to the vehicle seat S. The vehicle seat S includes an engagement portion 20 that is configured to engage with the attachment mechanism C1 of the child safety seat C to fix the child safety seat C to the vehicle seat S. The engagement portion 20 is disposed between the seat back S1 and the seat cushion S2. The engagement portion 20 and the attachment mechanism C1 are engaged with each other to be locked, whereby the child safety seat C can be installed on the vehicle seat S without a seatbelt. The attachment mechanism C1 is, for example, a lock mechanism formed based on an International Organization for Standardization (ISO) standard for child safety seat lock mechanisms.

Figure 5:
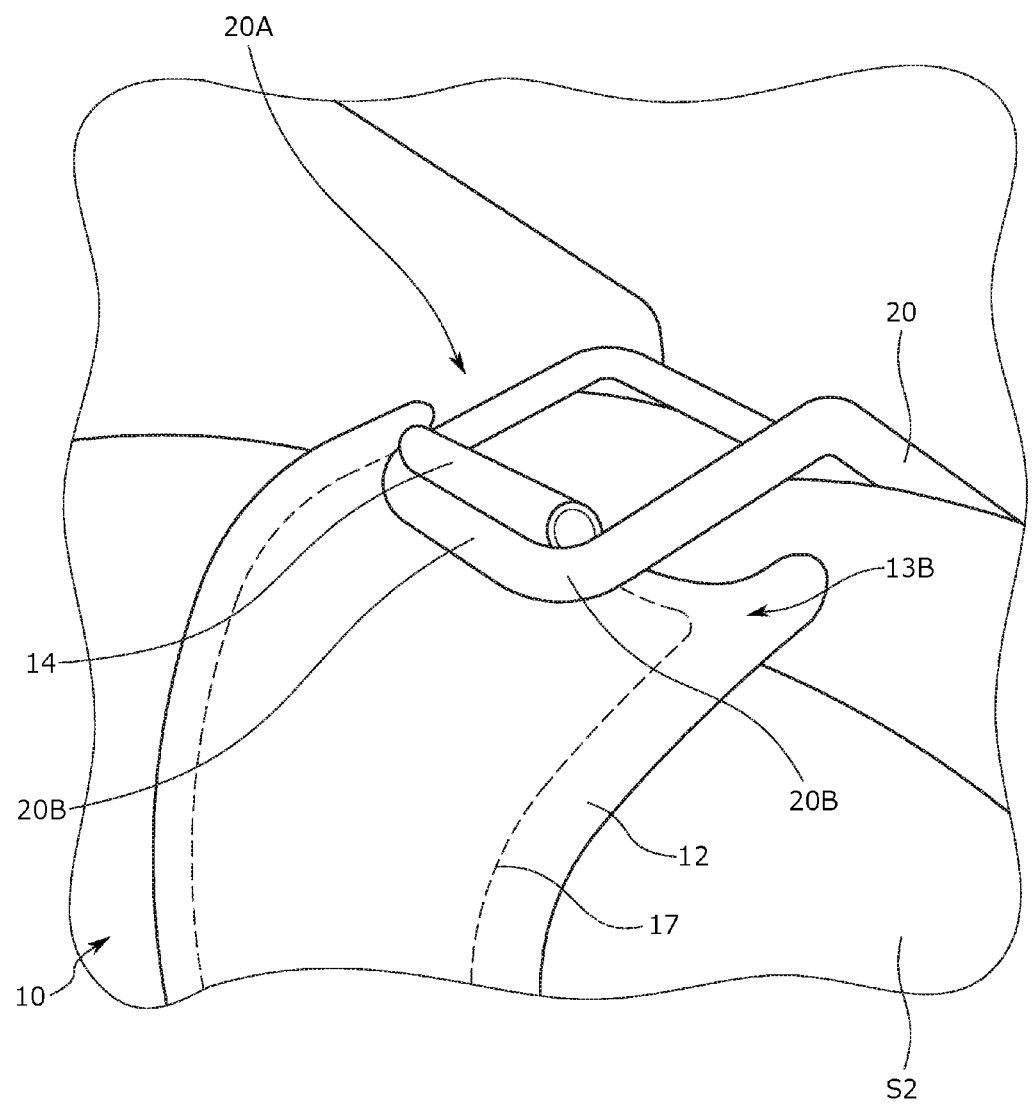
FIG. 5 is an explanatory, partial perspective drawing illustrating a state in which the cover member according to the first embodiment is hooked by an engagement portion having a U-shaped portion.

As shown in FIG. 5, the engagement portion 20 that is configured to engage with the attachment mechanism C1 is formed of a wire having an end of a U-shaped portion 20A (an example of an "end portion" of the engagement portion 20). When the child safety seat C is installed, the attachment mechanism C1 is locked to a front end portion 20B (i.e., a front end of the end portion of the engagement portion 20).

Figure 3:
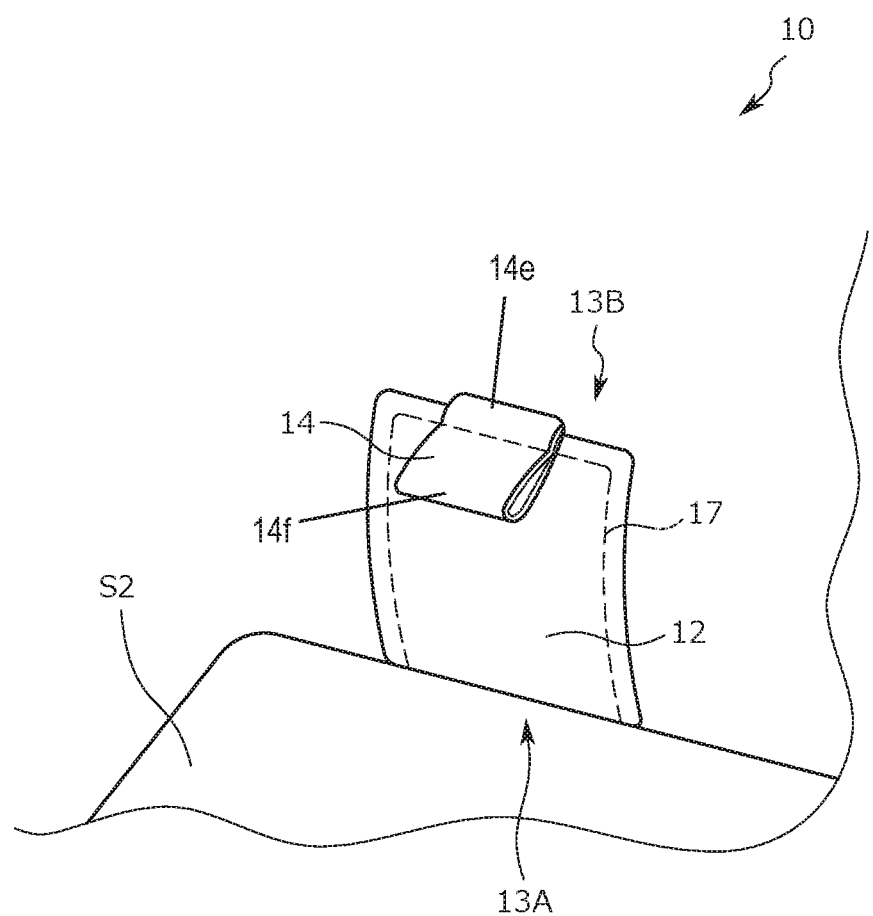
FIG. 3 is an enlarged, partial perspective view of an attachment portion of a cover member, according to a first embodiment.

In addition, a cover member 10 is provided on the seat cushion S2, as shown in FIGS. 1 to 3. When the child safety seat C is not installed, the cover member 10 is hooked by the engagement portion 20 to cover at least a portion of the engagement portion 20.

Figure 6:
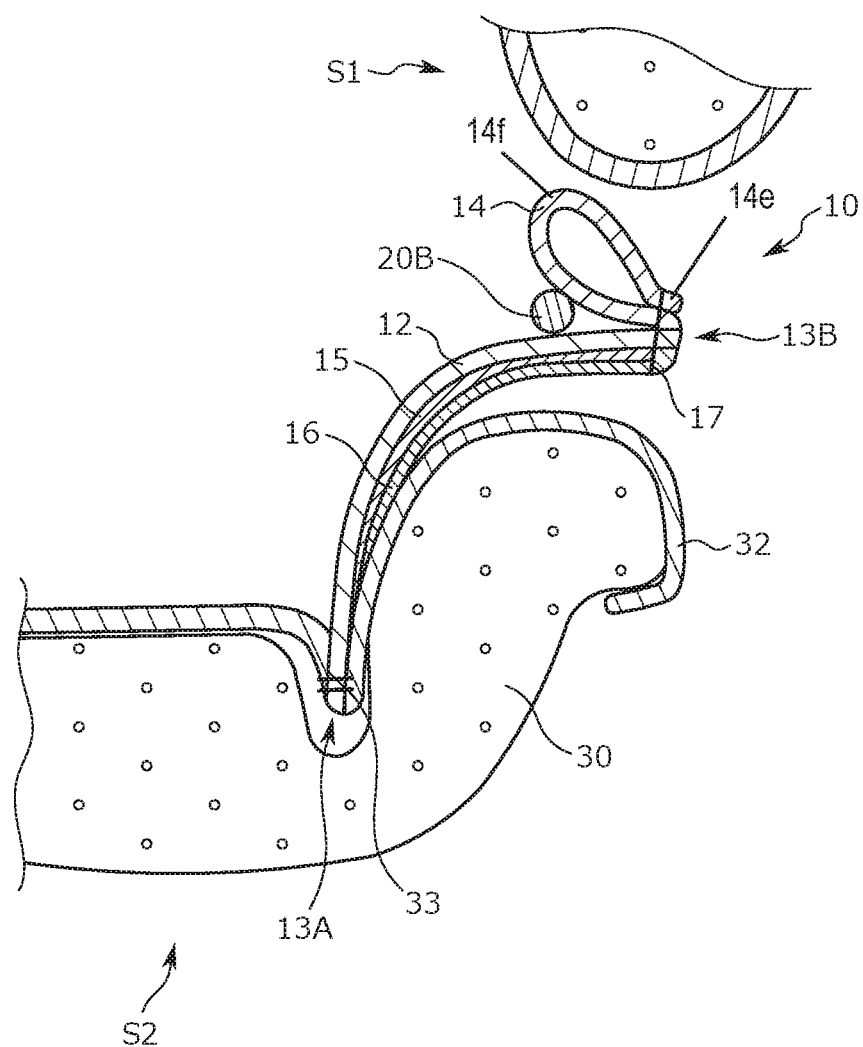
FIG. 6 is a cross-sectional view taken along the line VI-VI of FIG. 1, of a vehicle seat including the cover member according to the first embodiment.

As shown in FIG. 3, a first end (a fixed end 13A) of the cover member 10 is a fixed end that is fixed to the seat cushion S2, and a second end (a free end 13B) thereof is a free end that is not fixed to the seat cushion S2. As shown in FIG. 6, the fixed end 13A is sewn via a second sewing portion 33 together with a cover 32 covering a cushion pad 30 of the seat cushion S2, thereby being fixed to the seat cushion S2.

Also, as shown in FIG. 3, the cover member 10 also includes a flap 12 (a base material of the cover member 10) and a tab 14 (a projecting portion) provided on an upper surface of the flap 12. In the following descriptions, in a state where the free end 13B faces the engagement portion 20, a surface of the flap 12 facing upward is an upper surface thereof and a surface of the flap 12 facing downward is a lower surface thereof. In an embodiment, the tab 14 is a tab-shaped portion extending from a connecting portion 14e with the flap 12 toward the fixed end 13A and includes an extending end 14f that is opposite to the connecting portion 14e.

Figure 4:
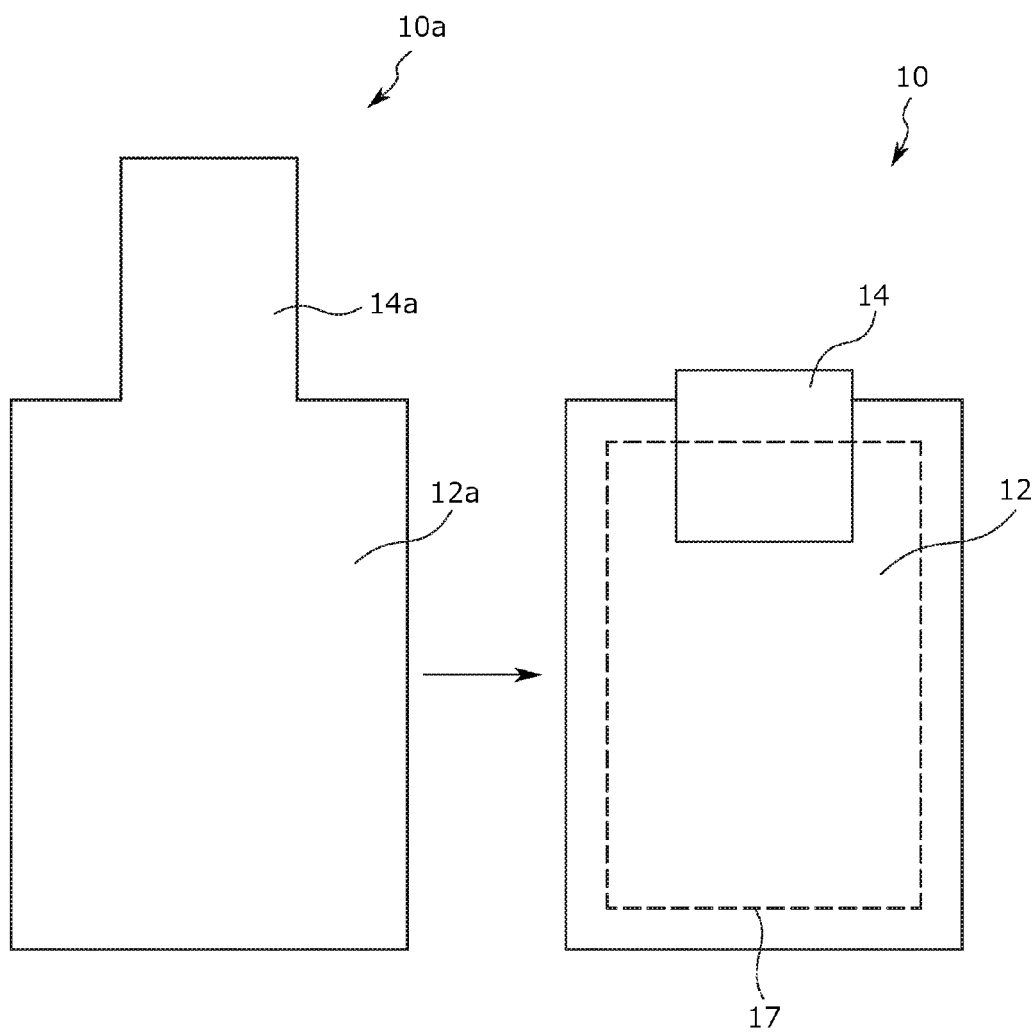
FIG. 4 is a schematic diagram of the cover member, according to the first embodiment.

As shown in FIG. 4, a cover member 10a, which has not been sewn, forms one cover including a flap forming area 12a and a tab forming area 14a that extends to protrude from an end of the flap forming area 12a. As shown in FIGS. 4 and 6, the tab forming area 14a (as a loop portion) is folded in a loop, and the tab 14 is then sewn via a first sewing portion 17 together with a cushion material 15 and a backing cloth 16 that are provided on a back surface of the flap 12. Thus, the cover member 10 shown in FIG. 3 is formed. Accordingly, the cover member 10 is a member formed by sewing the cover, the cushion material, and the backing cloth. Therefore, the integrity of the cover member 10 with the vehicle seat S can be improved, thereby making the cover member 10 less noticeable. As a result, an aesthetic design of the vehicle seat S can be improved, and the strength and cushioning properties of the cover member 10 can be enhanced.

The cover forming the cover member 10 is made of fabric, artificial leather, genuine leather, or the like. The cushion material 15 forming the cover member 10 is made of urethane foam, or the like. The backing cloth 16 forming the cover member 10 is made of nylon, nonwoven cloth, or the like.

With reference to FIGS. 7 to 10, engagement between the cover member 10 and the engagement portion 20 when the cover member 10 is pushed toward the engagement portion 20 or is pulled out is described. FIGS. 7 to 10 show simplified sectional views taken along the line VI-VI.

Figure 7:
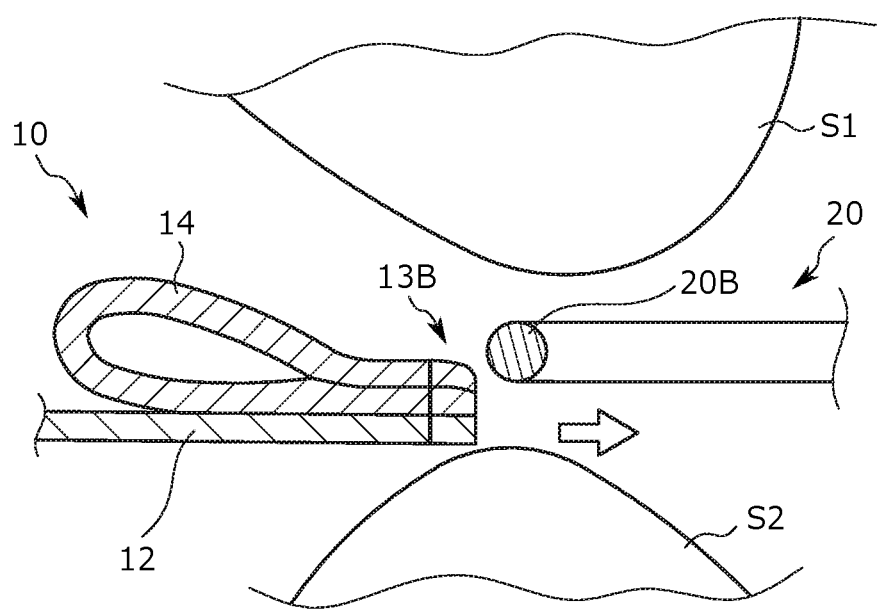
FIG. 7 is an explanatory, partial cross-sectional drawing illustrating engagement between the cover member and the engagement portion.
Figure 8:
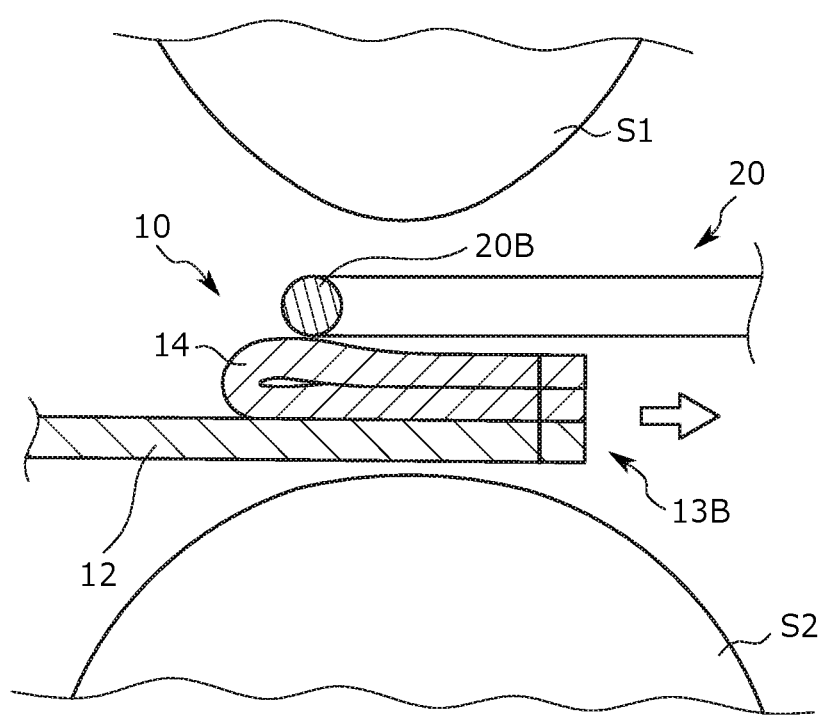
FIG. 8 is an explanatory, partial cross-sectional drawing illustrating engagement between the cover member and the engagement portion.

As shown in FIG. 7, the free end 13B of the cover member 10 is first pushed between the engagement portion 20 and the seat cushion S2. As a result, the tab 14 is moved in a pushing direction while being sandwiched and pressed between the front end portion 20B of the engagement portion 20 and the seat cushion S2, as shown in FIG. 8.

Figure 9:
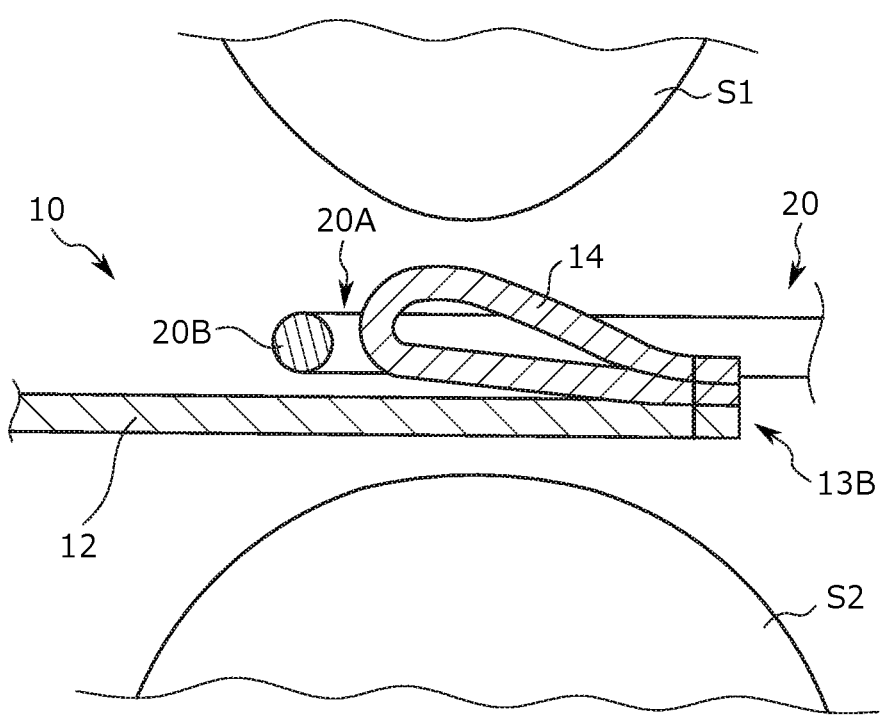
FIG. 9 is an explanatory, partial cross-sectional drawing illustrating engagement between the cover member and the engagement portion.

Next, as shown in FIG. 9, an end of the tab 14, which is adjacent to the fixed end 13A, is further pushed to pass beyond the front end portion 20B. As a result, the tab 14 is released from its pressed state by the front end portion 20B and the seat cushion S2 to be projected (expanded) upward on an inner side of the U-shaped portion 20A.

Figure 10:
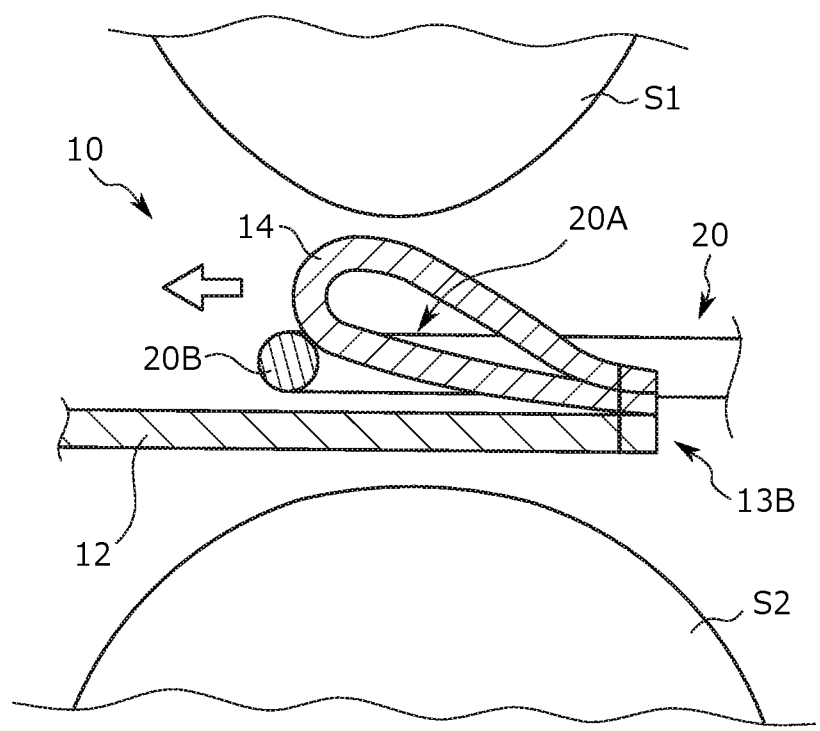
FIG. 10 is an explanatory, partial cross-sectional drawing illustrating engagement between the cover member and the engagement portion.

The cover member 10 is then pulled back toward the fixed end 13A from the state shown in FIG. 9. As a result, a rear end of the tab 14 is brought into contact with the front end portion 20B and is hooked by the front end portion 20B, as shown in FIG. 10.

As shown in FIGS. 5 and 6, when the free end 13B of the cover member 10 is inserted between the engagement portion 20 and the seat cushion S2, the tab 14 of the cover member 10 is disposed on the inner side of the U-shaped portion 20A of the engagement portion 20 and is hooked by the front end portion 20B. Accordingly, a portion of the front end portion 20B of the engagement portion 20 is covered by the tab 14. Therefore, the free end 13B of the cover member 10 is inserted between the engagement portion 20 and the seat cushion S2, whereby the cover member 10 can be easily hooked by the engagement portion 20.

When the cover member 10 is pulled out toward the fixed end 13A, the tab 14 projecting on the inner side of the U-shaped portion 20A is brought into contact with the front end portion 20B. The tab 14 is formed into a loop to be elastically deformable, and thus the tab 14 is not easily (e.g., inadvertently) unhooked or removed from the front end portion 20B even if a tilt angle of the seat back S1 is changed.

Figure 11:
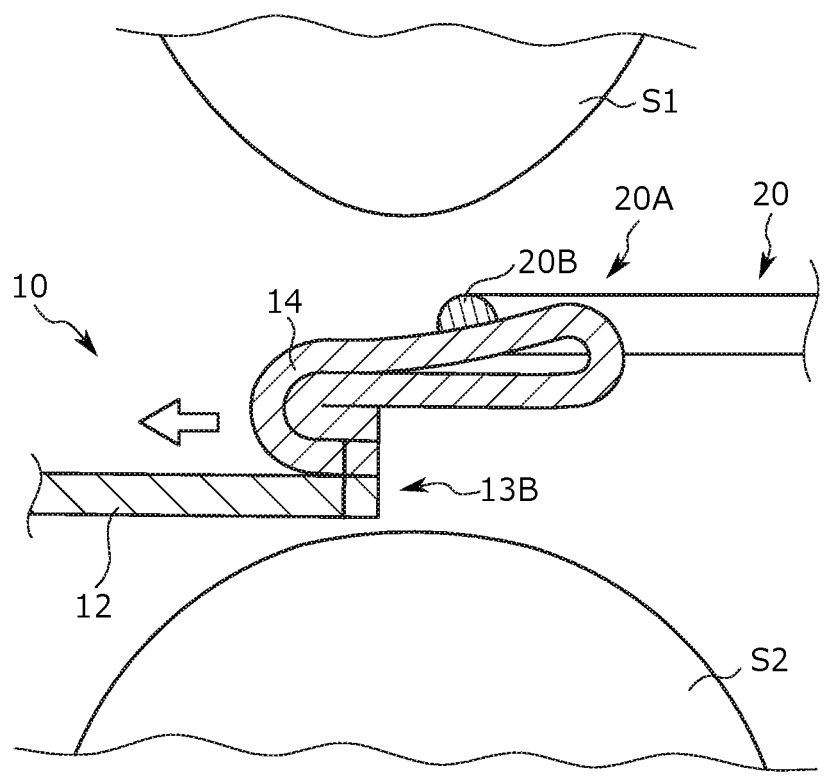
FIG. 11 is an explanatory, partial cross-sectional drawing illustrating engagement between the cover member and the engagement portion.

When the cover member 10 is further pulled out toward the fixed end 13A, the tab 14 is pulled out while an upper portion of the tab 14 is pressed by the front end portion 20B in the up-to-down direction as shown in FIG. 11. When an end portion (an end portion positioned on the opposite side of the connecting portion with the flap 12) of the tab 14 passes over the front end portion 20B, the tab 14 is released from the pressed state by the front end portion 20B to return to the state shown in FIG. 7.

In the embodiment, the width (the width in the seat width direction) of the tab 14 is smaller than that of the U-shaped portion 20A of the engagement portion 20, whereby the tab 14 is easily inserted into the inner side of the U-shaped portion 20A. Therefore, when the free end 13B of the cover member 10 is inserted between the engagement portion 20 and the seat cushion S2, the tab 14 is easily hooked by the front end portion 20B. The width (the width in the seat width direction) of the flap 12 may be larger than that of the U-shaped portion 20A of the engagement portion 20. Accordingly, the strength of the flap 12 of the cover member 10 can be enhanced.

In attaching the child safety seat C to the engagement portion 20, the cover member 10 is pulled out toward the front of the seat, whereby the tab 14 is easily deformed. Therefore, the tab 14 can be unhooked from the front end portion 20B.

In the cover member 10 described above, the tab 14 is formed by folding a portion of the flap 12 in a loop. Therefore, the number of components of a mechanism for allowing the cover member 10 to be hooked by the engagement portion 20 can be reduced.

Figure 12:
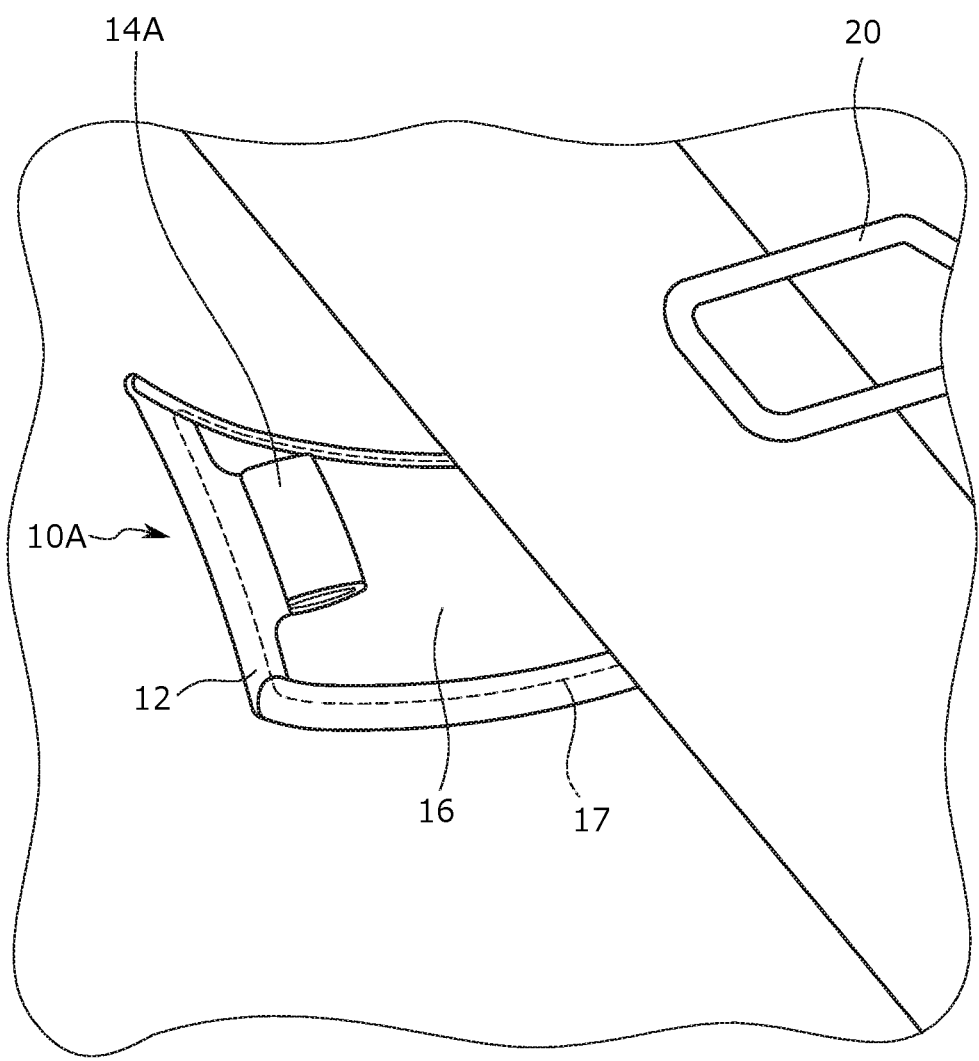
FIG. 12 is an enlarged, partial perspective view of an attachment portion of a cover member according to a second embodiment of the present disclosure.
Figure 13:
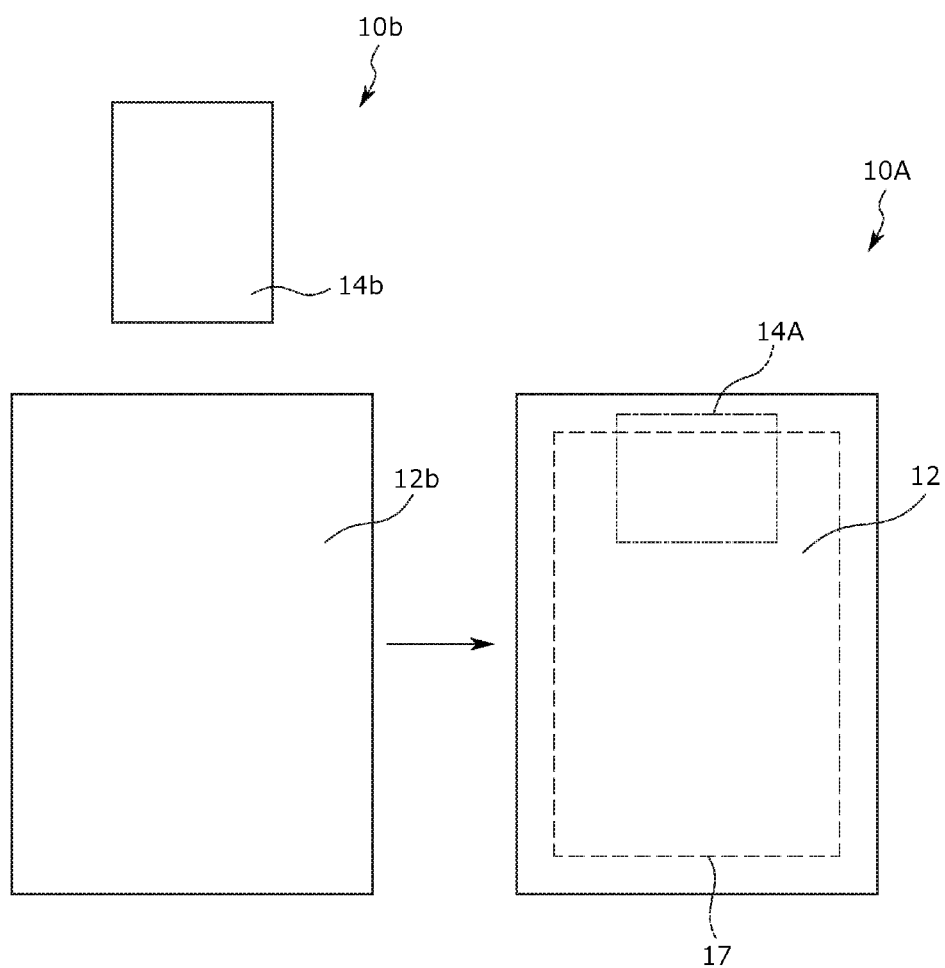
FIG. 13 is a schematic diagram of the cover member according to the second embodiment.
Figure 14:
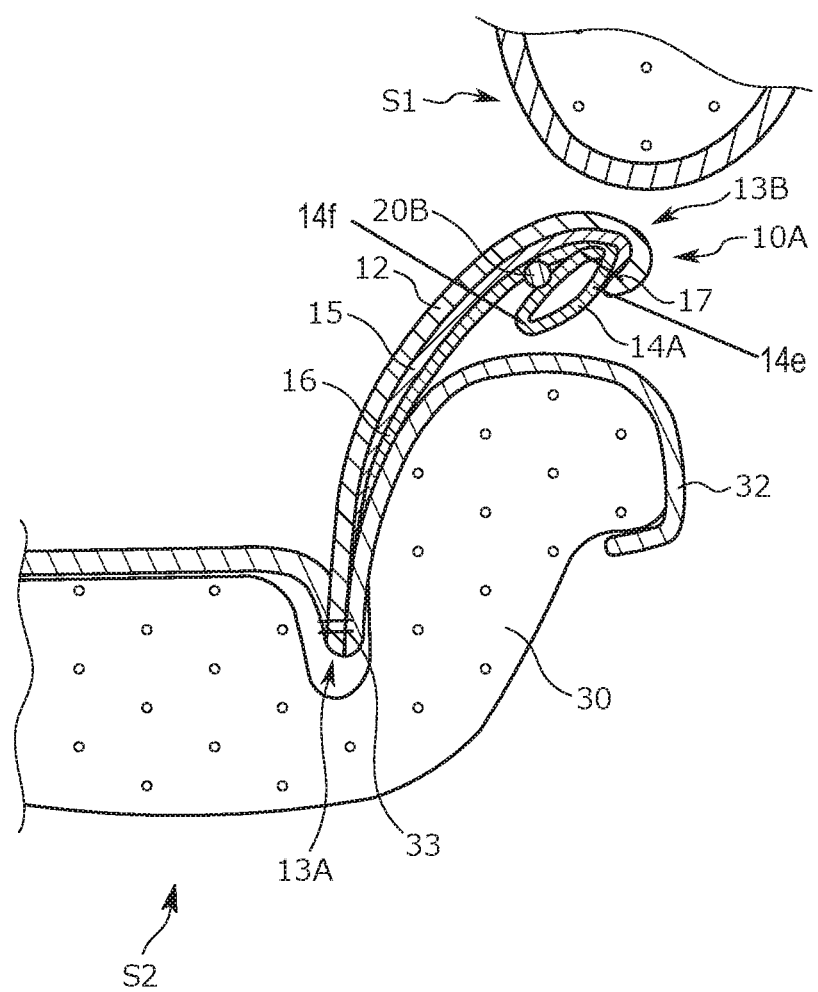
FIG. 14 is a cross-sectional view taken along the line VI-VI of FIG. 1, of a vehicle seat including the cover member according to the second embodiment.

A second embodiment of the present disclosure is now described on the basis of FIGS. 12 to 14. A cover member 10A according to the second embodiment is different from the cover member 10 according to a first embodiment in that a tab 14A is provided on a lower surface of the cover member 10A and is not formed integrally with the flap 12, and the cover member 10A is the same as the cover member 10 in other respects. The differences from the cover member 10 according the first embodiment are mainly described below.

As shown in FIG. 12, the tab 14A is provided on a lower surface of the flap 12 in the cover member 10A.

As shown in FIG. 13, a cover member 10b representing the cover member 10A, which has not been sewn, includes a flap forming area 12b and a tab forming area 14b that are formed separately from each other. The tab 14A formed by folding the tab forming area 14b in a loop is disposed on a back surface (lower surface) of the flap 12, as shown in FIGS. 13 and 14. The tab 14A is sewn via the first sewing portion 17 together with the cushion material 15 and the backing cloth 16 that are provided on the back surface of the flap 12. Accordingly, the cover member 10A shown in FIG. 12 is formed.

In addition, as shown in FIG. 14, when the free end 13B of the cover member 10A is inserted between the engagement portion 20 and the seat back S1, the tab 14A of the cover member 10A is disposed on the inner side of the U-shaped portion 20A from above the engagement portion 20, thereby being hooked by the front end portion 20B of the U-shaped portion 20A. As a result, the U-shaped portion 20A is covered by the cover member 10. As described above, the free end 13B of the cover member 10A is inserted between the engagement portion 20 and the seat back S1, whereby the cover member 10A can be easily hooked by the engagement portion 20.

The tab 14A formed in a loop is elastically deformable, and is therefore not easily (e.g., inadvertently) unhooked or removed from the front end portion 20B even if the tilt angle of the seat back S1 is changed.

In addition, the width (the width in the seat width direction) of the tab 14A is shorter than that of the U-shaped portion 20A of the engagement portion 20, whereby the tab 14A is easily inserted into the inner side of the U-shaped portion 20A. As a result, when the free end 13B of the cover member 10A is inserted between the engagement portion 20 and the seat back S1, the tab 14A is easily hooked by the front end portion 20B. The width (the width in the seat width direction) of the flap 12 may be larger than that of the U-shaped portion 20A of the engagement portion 20. Accordingly, the flap 12 of the cover member 10A can widely cover the engagement portion 20. In addition, since the cover member 10A covers an upper portion of the engagement portion 20, the engagement portion 20 is not uncovered; therefore, an aesthetic design can be improved.

In attaching the child safety seat C to the engagement portion 20, the cover member 10A is pulled out toward the front of the seat, whereby the tab 14A is easily deformed. Therefore, the tab 14A can be easily unhooked from the front end portion 20B.

Figure 15:
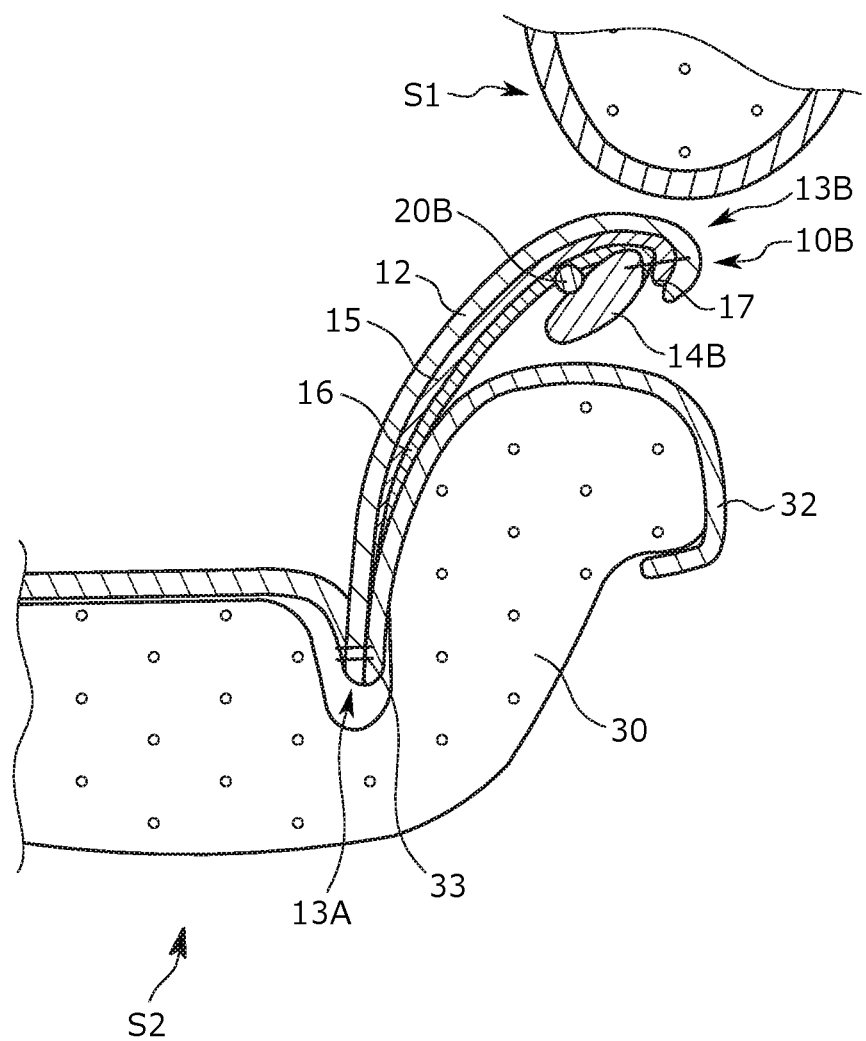
FIG. 15 is a cross-sectional view taken along the line VI-VI of FIG. 1, of a vehicle seat including a cover member according to a third embodiment of the present disclosure.
Figure 16:
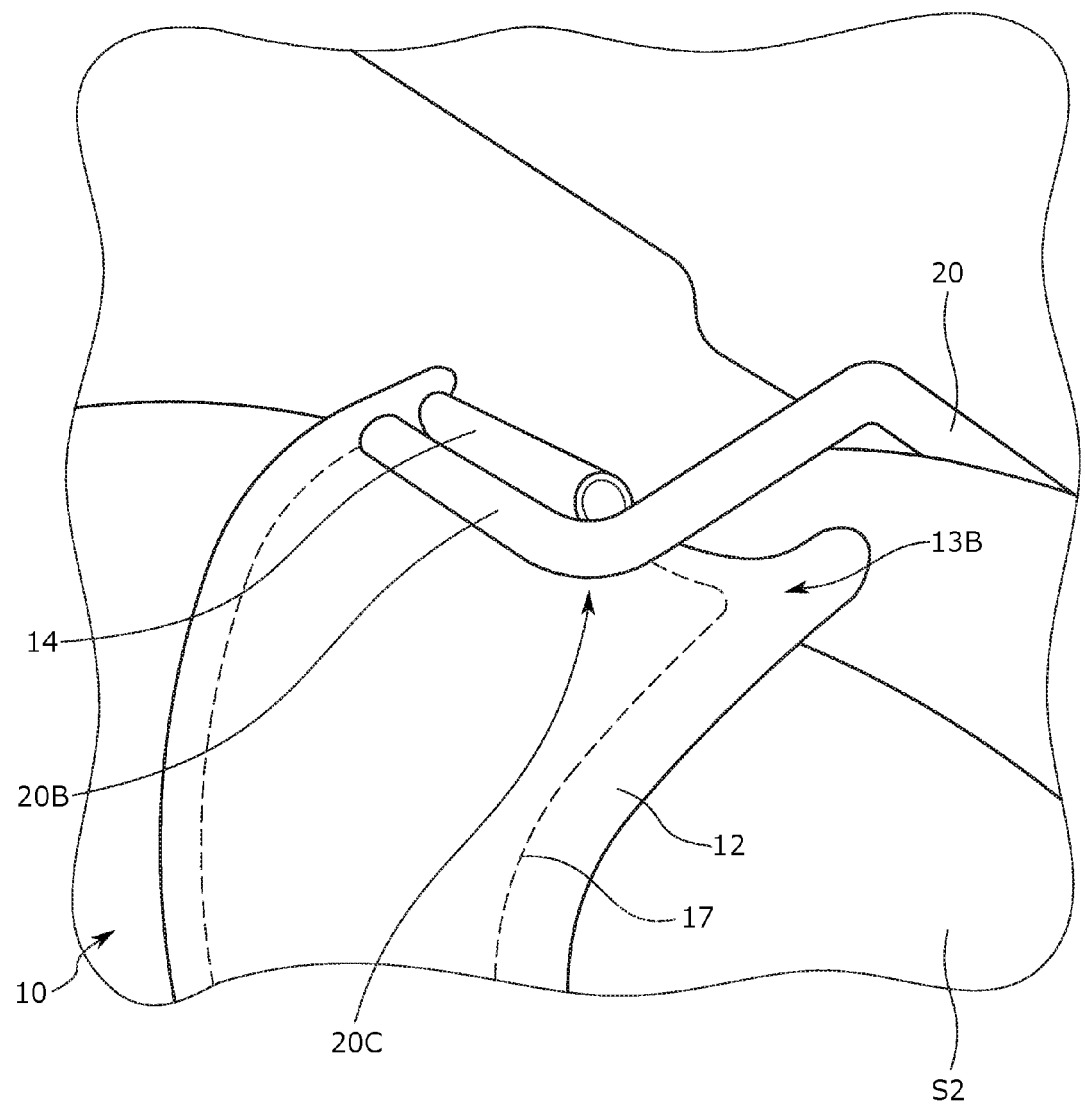
FIG. 16 is an explanatory, partial perspective drawing illustrating a state in which the cover member is hooked by an engagement portion having an L-shaped portion.

FIG. 15 shows a sectional view taken along the line VI-VI, of a cover member 10B according to a third embodiment. The cover member 10B according to the third embodiment is different from the cover member 10A according to the second embodiment in that the tab 14B of not a loop but a tongue is provided, and the cover member 10B is the same as the cover member 10A in other respects.

The tab 14B may be made of a flexible plastic material such as urethane foam, a synthetic resin, or PVC.

The present disclosure is not limited to the above embodiments. For example, in the first embodiment, the tab 14 formed by folding the tab forming area 14a of the cover member 10 in a loop may be provided on the lower surface of the cover member 10. In this case, when the free end 13B of the cover member 10 is pushed between the engagement portion 20 and the seat back S1, the tab 14 of the cover member 10 is inserted from above the engagement portion 20 into the inner side of the U-shaped portion 20A, thereby being hooked by the front end portion 20B.

In addition, in the second and third embodiments, the tabs 14A, 14B may be provided on the upper surface of the flap 12. Furthermore, the tabs 14A, 14B may be provided on a portion of the flap 12 other than an end of the flap 12 positioned adjacent to the free end 13B.

In the above embodiments, the cover member 10 covers the engagement portion 20 having the U-shaped portion 20A. However, the shape of an end portion of the engagement portion 20 is not limited to the U-shape. For example, the cover member 10 can also cover the engagement portion 20 having not the U-shaped portion 20A but an L-shaped portion 20C having an L-shape (an example of the end portion of the engagement portion 20) shown in FIG. 16. Also in this case, when the free end 13B is inserted between the seat cushion S2 and the engagement portion 20, the tab 14 is projected on an inner side of the L-shaped portion 20C; in other words, the tab 14 is projected on the rear side of the seat with respect to the front end portion 20B of the L-shaped portion 20C, therefore being hooked by the front end portion 20B.

What is claimed is:

1. A vehicle seat comprising:
   a seat back;
   a seat cushion that comprises a cover and a front end, wherein the front end is located opposite to a rear end of the seat cushion that is connected to the seat back;
   an engagement portion including an end portion that is configured to engage with an attachment mechanism of a child safety seat; and
   a cover member adapted to cover at least a portion of the engagement portion;
   wherein the engagement portion is disposed between a lower end portion of the seat back and an upper surface of the cover of the seat cushion;
   wherein the cover member includes
      a base material including a fixed end that is fixed to the cover of the vehicle seat and a free end that is not fixed to the cover,
      a projecting portion provided on one of an upper surface of the free end of the base material, the projecting portion configured to engage the end portion of the engagement portion; and
      a sewing portion at which the projecting portion and the free end of the base material are sewn together;
   wherein the projecting portion extends from the sewing portion towards the fixed end, and comprises an extending end that is opposite to the sewing portion,
   wherein the extending end of the projecting portion is a free end of the projecting portion,
   wherein a length between the sewing portion and the extending end is smaller than a length between the sewing portion and the fixed end, and
   wherein the fixed end is provided at a position closer to the front end of the seat cushion than the engagement portion, above the upper surface of the cover of the seat cushion, and below the engagement portion.

2. The vehicle seat according to claim 1, wherein the projecting portion is provided at a center of the free end of the base material in a seat width direction.

3. The vehicle seat according to claim 1, wherein the projecting portion is configured to hook a front end of the end portion of the engagement portion.

4. The vehicle seat according to claim 3, wherein the projecting portion is provided on the lower surface of the base material, the projecting portion being configured to hook the front end of the end portion from above the end portion of the engagement portion when the free end is inserted between the seat back and the engagement portion.

5. The vehicle seat according to claim 3, wherein the projecting portion is provided on the upper surface of the base material, the projecting portion being configured to hook the front end of the end portion from below the end portion of the engagement portion when the free end is inserted between the seat cushion and the engagement portion.

6. The vehicle seat according to claim 1, wherein the projecting portion is elastically deformable.

7. The vehicle seat according to claim 6, wherein the projecting portion is formed by sewing an end of the base material, which is positioned adjacent to the free end, in a folded state.

8. The vehicle seat according to claim 6,
wherein the base material and the projecting portion are formed separately from each other, and
wherein the projecting portion is sewn together with the base material.

9. The vehicle seat according to claim 6,
wherein the projecting portion includes a loop portion, and
wherein the loop portion is sewn to the free end.

10. The vehicle seat according to claim 1, wherein a width of the base material is larger than a width of the end portion of the engagement portion, and a width of the projecting portion is smaller than the width of the end portion of the engagement portion.

11. The vehicle seat according to claim 1, wherein the sewing portion is arranged at a position farther from the front end of the seat cushion than both the engagement portion and the extending end when the free end of the base material is inserted between the engagement portion and the one of the seat back and the seat cushion.

12. The vehicle seat according to claim 1, wherein the engagement portion is sandwiched between the projecting portion and the base material, and the cover member is hooked on the engagement portion.

* * * * *